(12) United States Patent
Blackledge et al.

(10) Patent No.: US 9,211,822 B1
(45) Date of Patent: Dec. 15, 2015

(54) FOOT REST ASSEMBLY

(71) Applicants: Chris Blackledge, Hanover, MI (US); Amy Blackledge, Hanover, MI (US)

(72) Inventors: Chris Blackledge, Hanover, MI (US); Amy Blackledge, Hanover, MI (US)

( * ) Notice: Subject to any disclaimer, the term of this patent is extended or adjusted under 35 U.S.C. 154(b) by 0 days.

(21) Appl. No.: 14/285,966

(22) Filed: May 23, 2014

(51) Int. Cl.
A47C 16/02 (2006.01)
B60N 2/44 (2006.01)
B60N 2/26 (2006.01)

(52) U.S. Cl.
CPC .............. B60N 2/4495 (2013.01); B60N 2/26 (2013.01)

(58) Field of Classification Search
CPC ................................ B60N 2/4495; B60N 2/26
USPC ...................................................... 297/423.4
See application file for complete search history.

(56) References Cited

U.S. PATENT DOCUMENTS

| | | | |
|---|---|---|---|
| 2,308,315 A | 1/1943 | Smith | |
| 4,198,716 A | 4/1980 | Hollyday, III | |
| 4,728,151 A | 3/1988 | Neufeld | |
| 4,874,203 A | 10/1989 | Henley | |
| 5,120,108 A | 6/1992 | Watson et al. | |
| 5,228,745 A * | 7/1993 | Hazel | 297/229 |
| D341,969 S * | 12/1993 | Hazelton Kroah | D6/715 |
| D342,405 S | 12/1993 | Hazel | |
| 5,549,353 A * | 8/1996 | Gaudet et al. | 297/182 |
| 5,560,679 A | 10/1996 | Barnholdt | |
| D377,423 S | 1/1997 | Latrella et al. | |
| 6,237,996 B1 * | 5/2001 | Chen et al. | 297/423.4 X |
| 6,561,588 B1 * | 5/2003 | Brady | 297/423.4 |
| 6,796,606 B2 * | 9/2004 | Marshall | 297/182 |
| 6,860,557 B2 * | 3/2005 | Jonasson | 297/423.4 X |
| 7,464,990 B2 * | 12/2008 | Collias | 297/423.4 X |
| 7,967,387 B2 * | 6/2011 | Langhorn | 297/423.4 |
| 8,061,773 B2 * | 11/2011 | Collias | 297/423.4 X |
| 8,757,723 B1 * | 6/2014 | Faust | 297/423.4 X |
| 2011/0037299 A1 * | 2/2011 | Kirkpatrick | B60N 2/26 297/217.1 |
| 2014/0265510 A1 * | 9/2014 | Storm et al. | 297/423.4 |
| 2015/0115685 A1 * | 4/2015 | Lee | 297/423.4 X |

FOREIGN PATENT DOCUMENTS

DE 20310316 9/2003
JP 2004249930 9/2004

* cited by examiner

Primary Examiner — Rodney B White

(57) ABSTRACT

A foot rest assembly releasably attaches to a vehicle seat and is positionable underneath a child safety seat to support the child's feet and help prevent the vehicle seat from getting dirty. The assembly includes a panel having a top surface, a bottom surface and a perimeter edge coupled to and extending between the top surface and the bottom surface. An upper section of the panel is planar and horizontally oriented when the upper section is positioned on a vehicle seat underneath a child safety seat. A lower section of the panel is coupled to and extends from the upper section wherein the lower section supports a user's feet and legs when the user is seated in the child safety seat. A coupler is attached to the panel and releasably couples the panel to the vehicle seat.

12 Claims, 3 Drawing Sheets

FOOT REST ASSEMBLY

BACKGROUND OF THE DISCLOSURE

1. Field of the Disclosure

The disclosure relates to foot rest devices and more particularly pertains to a new foot rest device for releasably attaching to a vehicle seat and positioning underneath a child safety seat to support the child's feet and help prevent the vehicle seat from getting dirty.

2. Summary of the Disclosure

An embodiment of the disclosure meets the needs presented above by generally comprising a panel having a top surface, a bottom surface and a perimeter edge coupled to and extending between the top surface and the bottom surface. An upper section of the panel is planar and horizontally oriented when the upper section is positioned on a vehicle seat underneath a child safety seat. A lower section of the panel is coupled to and extends from the upper section wherein the lower section supports a user's feet and legs when the user is seated in the child safety seat. A coupler is attached to the panel and releasably couples the panel to the vehicle seat.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
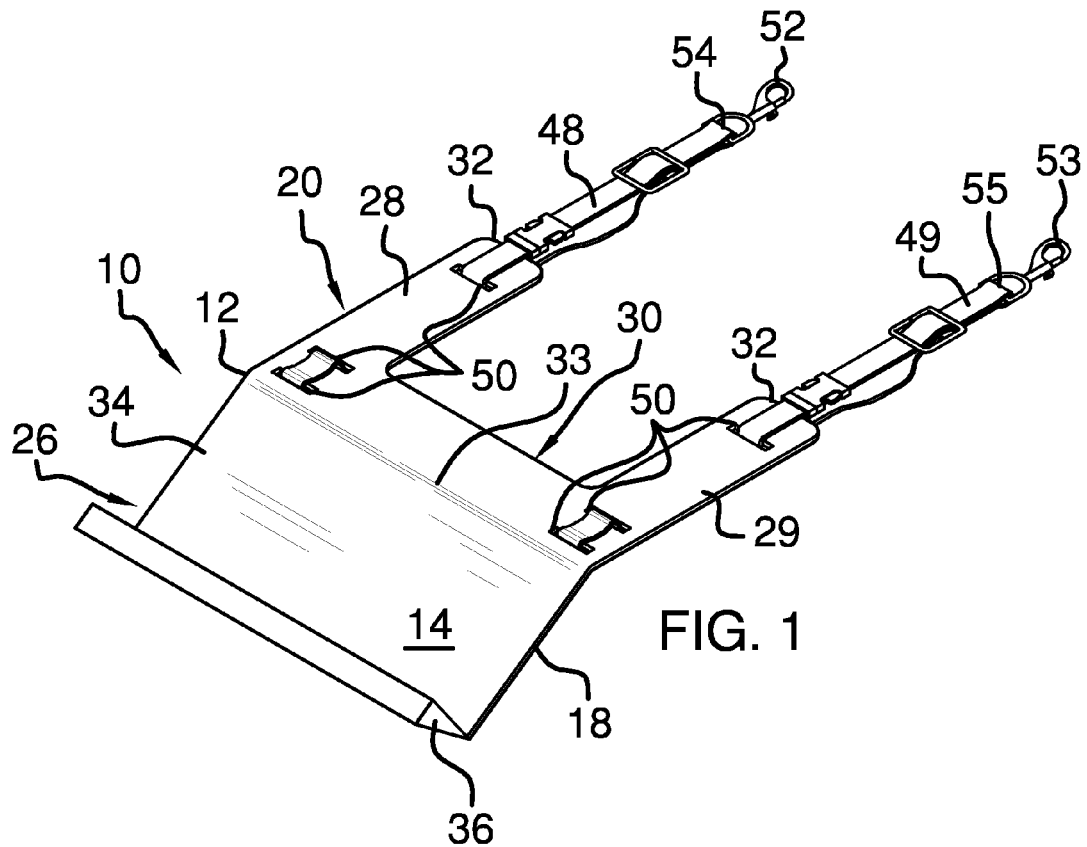
FIG. 1 is a top front side perspective view of a foot rest assembly according to an embodiment of the disclosure.
Figure 2:
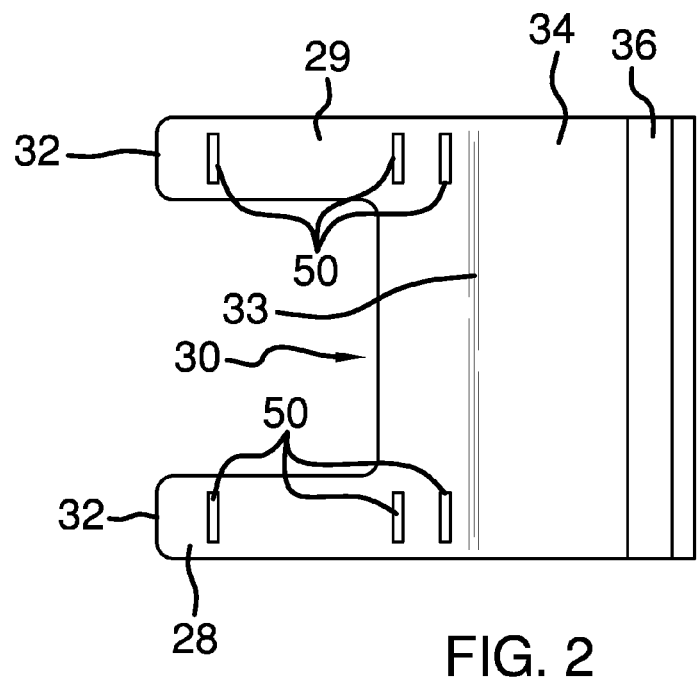
FIG. 2 is a top view of an embodiment of the disclosure.
Figure 3:
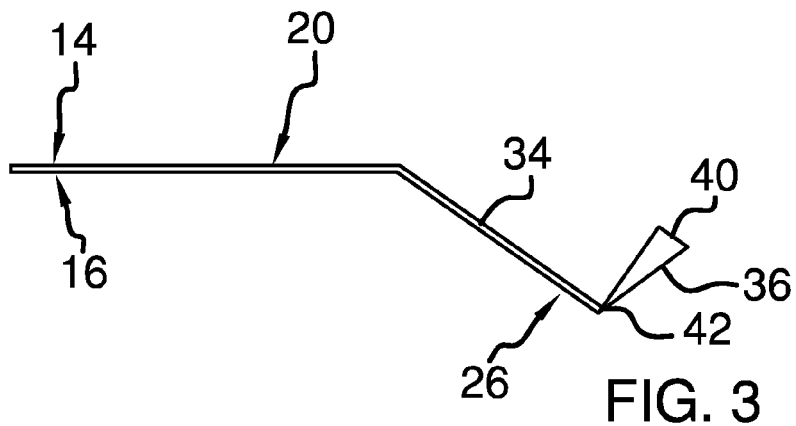
FIG. 3 is a side view of an embodiment of the disclosure.
Figure 4:
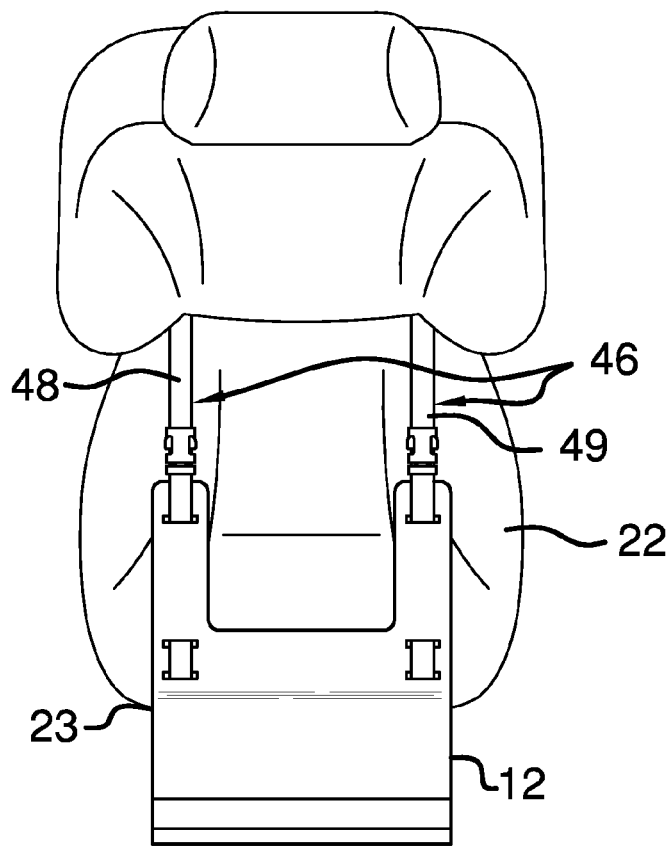
FIG. 4 is a top view of an embodiment of the disclosure in use.
Figure 5:
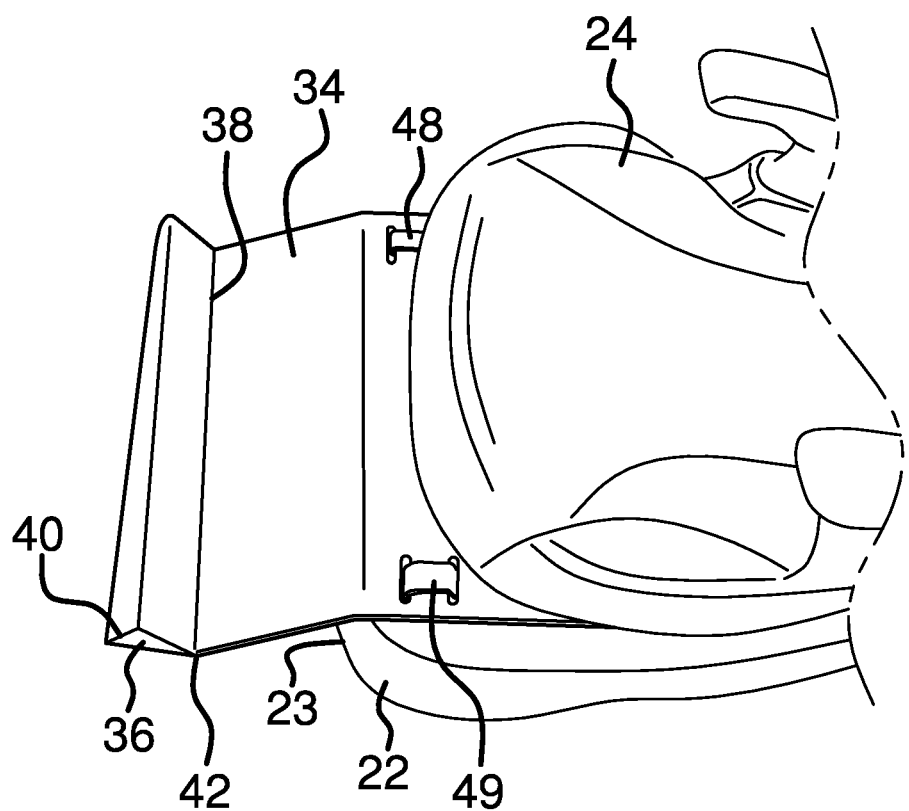
FIG. 5 is a top side perspective view of an embodiment of the disclosure in use.

With reference now to the drawings, and in particular to FIGS. 1 through 5 thereof, a new foot rest device embodying the principles and concepts of an embodiment of the disclosure and generally designated by the reference numeral 10 will be described.

As best illustrated in FIGS. 1 through 5, the foot rest assembly 10 generally comprises a panel 12 having a top surface 14, a bottom surface 16 and a perimeter edge 18 coupled to and extending between the top surface 14 and the bottom surface 16. An upper section 20 of the panel 12 is planar and horizontally oriented wherein the upper section 20 is configured for positioning on a vehicle seat 22 underneath a child safety seat 24. The term "child safety seat" is used to refer to any seat designed specifically to protect children from injury during collisions. A lower section 26 of the panel 12 is integrally coupled to and extends from the upper section 20 wherein the lower section 26 is configured to support a user's feet and legs when the user is seated in the child safety seat 24. The upper section 20 may include a pair of spaced arms 28, 29. Each of the arms 28, 29 is parallel and extends in a same direction with respect to each other. The spaced arms 28, 29 define a notch 30 extending into a distal side 32 of the upper section 20 with respect to the lower section 26. The panel 12 may be constructed from a rigid material, such as metal, plastic or other similar material.

The lower section 26 includes a backboard 34 and a base 36. The backboard 34 is coupled to and extends downwardly from the upper section 20. The base 36 is coupled to and extends outwardly from a bottom end 38 of the backboard 34. The backboard 34 may slant downwardly away from the upper section 20 to form an angle on the top surface 14 between 200 degrees and 250 degrees at a juncture of the upper 20 and lower 26 sections. The base 36 may slant upwardly and outwardly relative to the backboard 34. The base 36 has a first edge 40 and a second edge 42. The second edge 42 is attached to the bottom end 38 of the backboard 34. The base 36 may taper from the first edge 40 to the second edge 42 wherein the base 36 defines a wedge 44.

A coupler 46 is attached to the panel 12 and is configured for releasably coupling the panel 12 to the vehicle seat 22. As shown in the Figures, the coupler 46 may comprise a pair of straps 48, 49 coupled to and extending from the panel 12. The upper section 20 includes a plurality of slots 50 for receiving each of the straps 48, 49 therein. The straps 48, 49 may be adjustable. A pair of clips 52, 53 is provided. Each of the clips 52, 53 is coupled to a free end 54, 55 of an associated one of the straps 48, 49. Each of the clips 52, 53 is configured to attach to hooks that are conventionally coupled to the vehicle seat 22.

The lower section 26 may have a width between approximately 15.0 cm and 22.0 cm as measured from the proximal side 33 of the upper section 20 to the bottom end 38 of the backboard 34. The base 36 may have a width between approximately 1.5 cm and 4.0 cm as measured between the first edge 40 and the second edge 42.

In use, as stated above and shown in the Figures, the panel 12 is positioned on the vehicle seat 22 such that the lower section 26 extends over a front edge 23 of the vehicle seat 22. The clips 52, 53 are attached to hooks that are conventionally built into the vehicle seat 22. The child safety seat 24 is placed on top of the upper section 20 of the panel 12. In this manner, the assembly 10 supports the feet of a child sitting on the child safety seat 24, while also reducing the amount of dirt, mud, water, etc. that gets on the vehicle seat 22 from the child's shoes. Since the device 10 is attached to the vehicle seat 22, the child may also use the lower section 26 of the panel 12 as a step to facilitate climbing into the child safety seat 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A foot rest assembly comprising:
a panel having a top surface, a bottom surface and a perimeter edge coupled to and extending between said top surface and said bottom surface, an upper section of said panel being planar and horizontally oriented wherein said upper section is configured for positioning on a vehicle seat underneath a child safety seat, a lower section of said panel being integrally coupled to and extending from said upper section wherein said lower section is configured to support a user's feet and legs when the user is seated in the child safety seat; and
a coupler attached to said panel, said coupler being configured for releasably coupling said panel to the vehicle seat, wherein said coupler comprises a pair of straps coupled to and extending from said panel, wherein said upper section includes a plurality of slots for receiving each of said straps therein.

2. The assembly of claim 1, further comprising wherein said upper section includes a pair of spaced arms, each of said arms being parallel and extending in a same direction with respect to each other, said spaced arms defining a notch extending into a distal side of said upper section with respect to said lower section.

3. The assembly of claim 1, further comprising said straps being adjustable.

4. The assembly of claim 1, further comprising a pair of clips, each of said clips being coupled to a free end of an associated one of said straps.

5. The assembly of claim 1, further comprising said lower section including a backboard and a base, said backboard being coupled to and extending downwardly from said upper section, said base being coupled to and extending outwardly from a bottom end of said backboard.

6. The assembly of claim 5, further comprising said backboard slanting downwardly away from said upper section.

7. The assembly of claim 5, further comprising said base slanting upwardly and outwardly relative to said backboard.

8. The assembly of claim 5, further comprising said base having a first edge and a second edge, said base tapering from said first edge to said second edge wherein said base defines a wedge.

9. The assembly of claim 8, further comprising said second edge being attached to said bottom end of said backboard.

10. The assembly of claim 1, further comprising said panel being constructed from a rigid material.

11. A foot rest assembly comprising:
a panel having a top surface, a bottom surface and a perimeter edge coupled to and extending between said top surface and said bottom surface, an upper section of said panel being planar and horizontally oriented wherein said upper section is configured for positioning on a vehicle seat underneath a child safety seat, a lower section of said panel being integrally coupled to and extending from said upper section wherein said lower section is configured to support a user's feet and legs when the user is seated in the child safety seat, said panel being constructed from a rigid material;
wherein said upper section includes a pair of spaced arms, each of said arms being parallel and extending in a same direction with respect to each other, said spaced arms defining a notch extending into a distal side of said upper section with respect to said lower section;
wherein said lower section includes a backboard and a base, said backboard being coupled to and extending downwardly from said upper section, said base being coupled to and extending outwardly from a bottom end of said backboard, said backboard slanting downwardly away from said upper section, said base slanting upwardly and outwardly relative to said backboard, said base having a first edge and a second edge, said base tapering from said first edge to said second edge wherein said base defines a wedge, said second edge being attached to said bottom end of said backboard;
a coupler attached to said panel, said coupler being configured for releasably coupling said panel to the vehicle seat, said coupler comprising a pair of straps coupled to and extending from said panel, said straps being adjustable;
a pair of clips, each of said clips being coupled to a free end of an associated one of said straps; and
wherein said upper section includes a plurality of slots for receiving each of said straps therein.

12. A foot rest system comprising:
a vehicle seat;
a child safety seat positioned on said vehicle seat;
a panel having a top surface, a bottom surface and a perimeter edge coupled to and extending between said top surface and said bottom surface, an upper section of said panel being planar and horizontally oriented, said upper section being positioned on said vehicle seat underneath said child safety seat, a lower section of said panel being integrally coupled to and extending from said upper section wherein said lower section is configured to support a user's feet and legs when the user is seated in said child safety seat;
a coupler attached to said panel, said coupler releasably coupling said panel to said vehicle seat;
said panel being constructed from a rigid material;
wherein said upper section includes a pair of spaced arms, each of said arms being parallel and extending in a same direction with respect to each other, said spaced arms defining a notch extending into a distal side of said upper section with respect to said lower section;
wherein said lower section includes a backboard and a base, said backboard being coupled to and extending downwardly from said upper section, said base being coupled to and extending outwardly from a bottom end of said backboard, said backboard slanting downwardly away from said upper section, said base slanting upwardly and outwardly relative to said backboard, said base having a first edge and a second edge, said base tapering from said first edge to said second edge wherein said base defines a wedge, said second edge being attached to said bottom end of said backboard;
said coupler comprising a pair of straps coupled to and extending from said panel, said straps being adjustable;
a pair of clips, each of said clips being coupled to a free end of an associated one of said straps; and
wherein said upper section includes a plurality of slots for receiving each of said straps therein.

* * * * *